(12) United States Patent
Sandland, Sr.

(10) Patent No.: US 11,051,503 B2
(45) Date of Patent: Jul. 6, 2021

(54) FISHING ROD HOLDER SYSTEM AND METHOD

(71) Applicant: James Sandland, Sr., Fort Yates, ND (US)

(72) Inventor: James Sandland, Sr., Fort Yates, ND (US)

( * ) Notice: Subject to any disclaimer, the term of this patent is extended or adjusted under 35 U.S.C. 154(b) by 0 days.

(21) Appl. No.: 16/453,570

(22) Filed: Jun. 26, 2019

(65) Prior Publication Data
US 2019/0387730 A1 Dec. 26, 2019

Related U.S. Application Data

(60) Provisional application No. 62/690,176, filed on Jun. 26, 2018.

(51) Int. Cl.
*A01K 97/10* (2006.01)
*F21V 23/04* (2006.01)
*F21Y 115/10* (2016.01)

(52) U.S. Cl.
CPC .............. *A01K 97/10* (2013.01); *F21V 23/04* (2013.01); *F21Y 2115/10* (2016.08)

(58) Field of Classification Search
CPC ...... A01K 97/10; F21V 23/04; F21Y 2115/10
USPC ................ 248/545, 530, 85, 87, 156, 533
See application file for complete search history.

(56) References Cited

U.S. PATENT DOCUMENTS

| | | | | |
|---|---|---|---|---|
| 2,704,411 A * | 3/1955 | Carroll | ............... | A01K 97/125 43/17 |
| 3,112,910 A * | 12/1963 | Bal | ............... | F16B 7/10 248/161 |
| 3,586,274 A | 6/1971 | Hart | | |
| 4,866,873 A | 9/1989 | Van Valkenburg | | |
| 4,887,375 A * | 12/1989 | Shedd | ............... | A01K 87/00 43/21.2 |
| 7,162,828 B1 * | 1/2007 | Marina | ............... | A01K 97/11 43/15 |
| 7,568,306 B1 | 8/2009 | Rice, Sr. | | |
| 8,695,268 B2 * | 4/2014 | Gouthro | ............... | A01K 97/10 43/17 |
| 9,049,853 B1 | 6/2015 | Bourget | | |
| 2004/0206860 A1 * | 10/2004 | Bolinder | ............... | G09F 7/18 248/156 |
| 2010/0257794 A1 * | 10/2010 | Stark | ............... | E04H 12/2215 52/158 |
| 2011/0302820 A1 * | 12/2011 | Gouthro | ............... | A01K 97/10 43/17 |
| 2012/0204469 A1 * | 8/2012 | Kowalski | ............... | A01K 97/10 43/17.5 |

* cited by examiner

*Primary Examiner* — Muhammad Ijaz
(74) *Attorney, Agent, or Firm* — Acumen Intellectual Property; Michael C. Balaguy

(57) ABSTRACT

A fishing rod holder including a stake, a foot engaging flange, an elongate tubular member, and a rod retainer. The fishing rod holder is designed to be inserted into a substantially planar surface for retaining a fishing rod in a static position. The stake is an elongate member having a pointed tip. The foot engaging flange is attached to the stake at an end distal to the pointed tip. The elongate tubular member is attached in series with the stake and the foot engaging flange. The rod retainer is sized to telescopically couple with the elongate tubular member. The rod retainer is configured to hold a fishing rod. The fishing rod holder effectively holds a fishing rod at a vector defined by the placement of the stake.

2 Claims, 5 Drawing Sheets

FISHING ROD HOLDER SYSTEM AND METHOD

CROSS-REFERENCE TO RELATED APPLICATION(S)

The present application is related to and claims priority to U.S. Provisional Patent Application No. 62/690,176 filed Jun. 26, 2018, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of angler gear of existing art and more specifically relates to a fishing rod holder.

RELATED ART

A fishing rod holder system is a device to independently hold a fishing rod and reel while a user is fishing in a body of water. Fishing rod holders are made from a variety of materials including plastic, metal or any material strong enough to hold a fishing rod in place regardless of weather conditions or if a fish has taken the bait or lure being used. Rod holders may utilize stakes, coils, brackets or any combination of apparatus that can be attached to a fishing pole and secured to the ground or other media. There are numerous systems for holding fishing rods. In one iteration, a coiled stake or staff is impaled into the ground, the coiled section holds the fishing rod while the buried staff or stake section holds the entire apparatus in place. In another iteration, a clamping device is used to hold the rod and the stake attached to the clamping device is used to penetrate the ground for rod holder stability. Fishing rod holders are used on shorelines and on the sides of rivers and streams. However, most of the rod holder designs utilize a ground-level rod-holding position thereby making it necessary for users to reach down or bend over to utilize the equipment. Also, during night-time fishing rod holders are often misplaced or lost due to the difficulty involved in locating them in the dark. A suitable solution is desired.

U.S. Pat. No. 7,568,306 to James D. Rice relates to a rod holding apparatus. The described rod holding apparatus includes a tube having ground penetrating stakes at one end for attaching into the earth for removably supporting a fishing pole or umbrella or the like. The rod holding apparatus incorporates a slide hammer for driving the stake into the ground.

SUMMARY OF THE INVENTION

In view of the foregoing disadvantages inherent in the known fishing rod holder art, the present disclosure provides a novel fishing rod holder system and method. The general purpose of the present disclosure, which will be described subsequently in greater detail, is to provide an efficient and effective fishing rod holder system and method.

A fishing rod holder is disclosed herein. The fishing rod holder comprises a stake, a foot engaging flange, an elongate tubular member, and a rod retainer. The fishing rod holder is designed to be inserted into a substantially planar surface for retaining a fishing rod in a static position. The stake is an elongate member preferably having a pointed tip. The foot engaging flange is attached to the stake at an end distal to the pointed tip. The elongate tubular member is attached in series with the stake and the foot engaging flange. The rod retainer is sized to telescopically couple with the elongate tubular member. The rod retainer is configured to hold a fishing rod. The fishing rod holder effectively holds a fishing rod at a vector defined by the placement of the stake. The telescopic functionality allows the fishing rod to be raised and lowered according to preference.

According to another embodiment, a method of use for the fishing rod holder is also disclosed herein. The method includes a step of providing the fishing rod holder as described above; inserting a stake of the fishing rod holder into a substantially planar surface; coupling a fishing rod to the fishing rod holder; and activating an illumination device on the fishing rod holder.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a fishing rod holder system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to angler gear and more particularly to a fishing rod holder as used to improve the retention of a fishing rod.

Generally, the fishing rod holder system may include an adjustable cylindrical rod housing and ground insertion unit being defined by a top, rod holding section, and a bottom, base section opposite the top section with a cylindric length between both sections. In a preferred embodiment, the rod housing unit may comprise a plurality of two cylindric sections that are sized to allow for telescopic adjustment.

The plurality of telescoping cylindric sections may enable the manual resizing of both sections into a length determined by user needs. Further, the rod housing unit may include a carrying handle molded into the upper section as well as an LED light to locate the rod housing unit and prevent accidental collisions with the invention when in use. Rod housing unit length adjustments are achieved through the use of a depressible peg on the top section aligned with a chosen peg holes on the bottom section. Once the desired length is chosen, the peg will decompress and snap into the chosen peg hole.

The bottom base section may include an attached spike or stake which may be utilized to insert the fishing rod holder system into the ground or other media. The area above the spike section includes a protuberant which may allow a user's foot to be used during ground insertion and provide stability once inserted.

The invention may be constructed, utilized and adjusted in a length such that an average user may utilize the rod holding section of the invention without the need to maneuver their body into an uncomfortable or painful position.

Referring now more specifically to the drawings by numerals of reference, there is shown in FIGS. 1-4, various views of a fishing rod holder 100.

Figure 1:
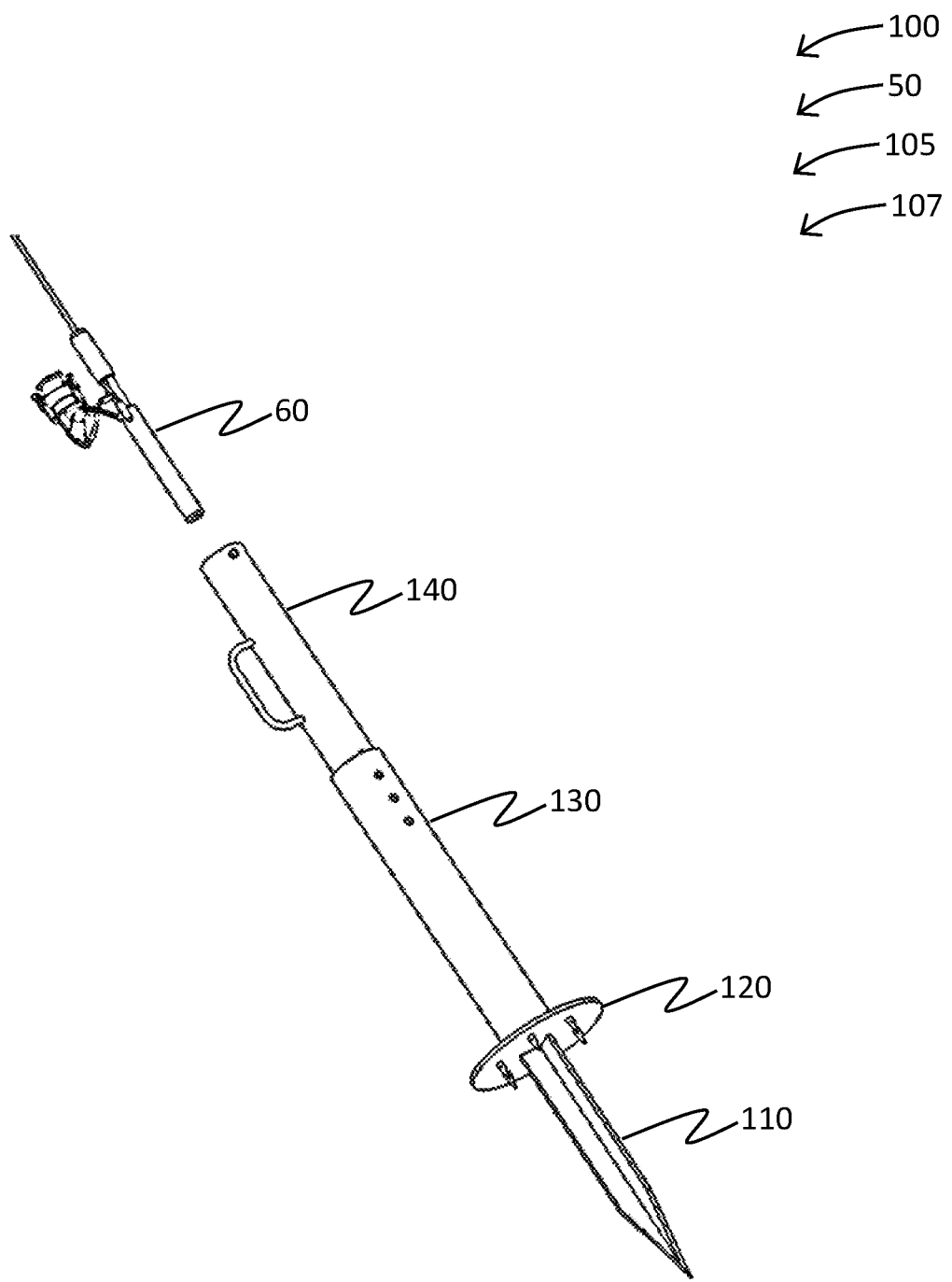
FIG. 1 is a perspective view of the fishing rod holder during an 'in-use' condition, according to an embodiment of the disclosure.

FIG. 1 shows a fishing rod holder 100 during an 'in-use' condition 50, according to an embodiment of the present disclosure. Here, the fishing rod holder 100 may be beneficial for use to hold a fishing rod. As illustrated, the fishing rod holder 100 may include a stake 110 having a pointed tip at the end thereof. A foot engaging flange 120 attached to the stake 110 at an end distal to the pointed tip. The stake 110 may be detachable from the foot engaging flange 120. The stake 110 may be replaceable with a stake 110 of different dimensions and composition.

In one embodiment, the stake 110 may be a plurality of blades used to penetrate the substantially planar surface and provide support to the fishing rod holder 100. In another embodiment, the stake 110 may comprise a helical shape. Any size and shape of the stake 110 that is preferable for the substantially planar surface may be considered. An elongate tubular member 130 attached in series with the stake 110 and the foot engaging flange 120. The foot engaging flange 120 may be detachable from the elongate tubular member 130. Detachment of the foot engaging flange 120 allows for the fishing rod holder 100 to be easily stored in pieces. The foot engaging flange 120 may be replaced with a foot engaging flange 120 of different dimensions. A rod retainer 140 that is configured to retain a fishing rod 60. The rod retainer 140 is sized to be telescopically coupled with the elongate tubular member 130. The stake 110 is configured to be inserted into a substantially planar surface for retaining the fishing rod in a static position.

According to one embodiment, the fishing rod holder 100 may be arranged as a kit 105. In particular, the fishing rod holder 100 may further include a set of instructions 107. The instructions 107 may detail functional relationships in relation to the structure of the fishing rod holder 100 such that the fishing rod holder 100 can be used, maintained, or the like, in a preferred manner.

Figure 2:
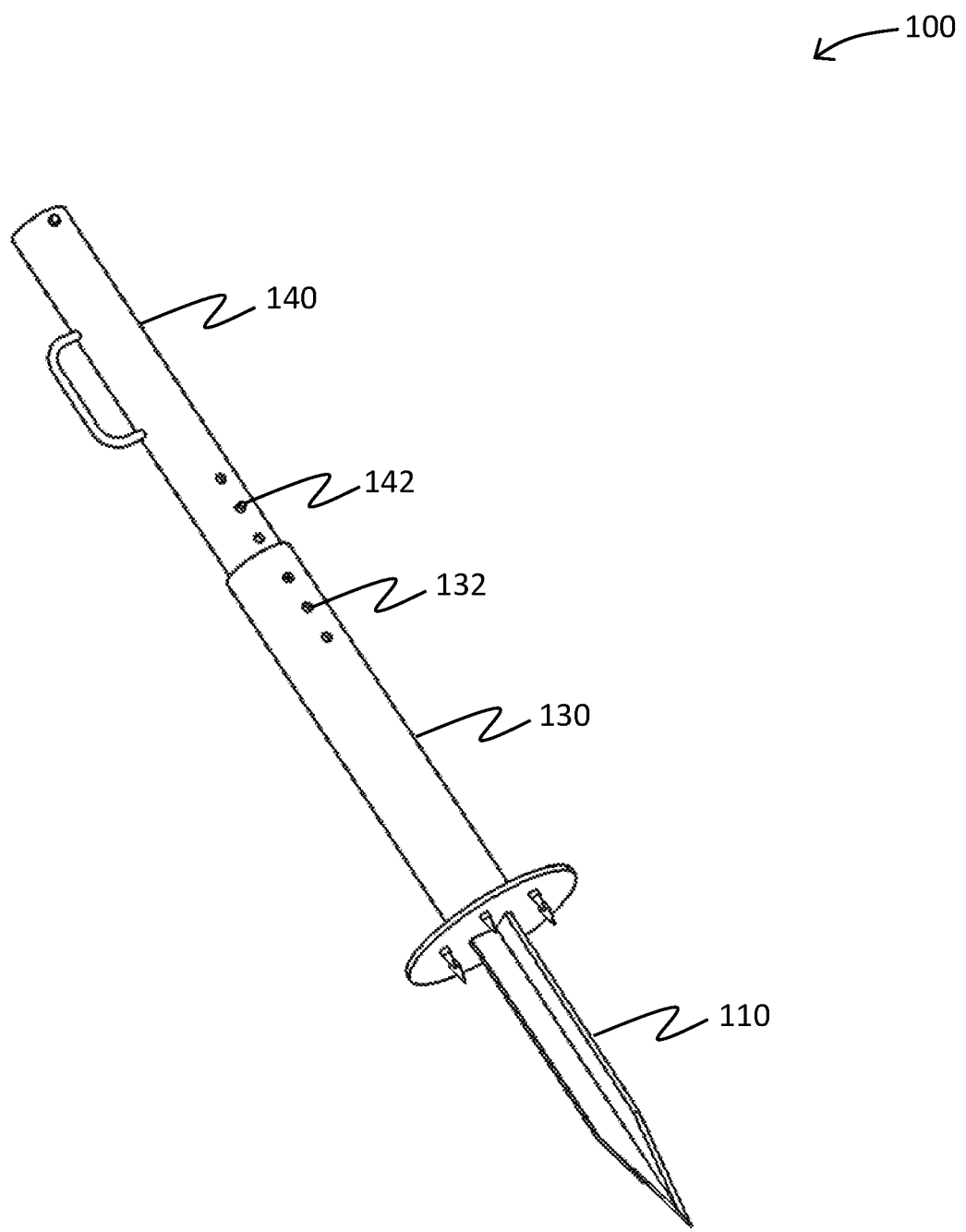
FIG. 2 is a perspective view of the fishing rod holder of FIG. 1, according to an embodiment of the present disclosure.

FIG. 2 shows the fishing rod holder 100 of FIG. 1, according to an embodiment of the present disclosure. As above, the fishing rod holder 100 may include a stake 110 having a pointed tip at the end thereof. A foot engaging flange 120 is attached to the stake 110 at an end distal to the pointed tip. An elongate tubular member 130 attached in series with the stake 110 and the foot engaging flange 120. A rod retainer 140 that is configured to retain a fishing rod 60 (FIG. 1). The rod retainer 140 is sized to be telescopically coupled with the elongate tubular member 130. The elongate tubular member 130 may include at least one peg aperture 132. Coincidently, the rod retainer 140 may include at least one peg 142 configured to mate with the at least one peg aperture 132. The at least one peg 142 may endure an outwardly force from the rod retainer 140 by being in communication with a spring. In operation, the at least one peg 142 is depressed against the force of the spring. When the at least one peg 142 is depressed, the rod retainer 140 may pass through the elongate tubular member 130 in a telescopic fashion. The at least one peg 142 is then extended through the at least one peg 142 aperture 132 of the elongate tubular member 130, thereby securing the rod retainer 140. The stake 110 is configured to be inserted into a substantially planar surface for retaining the fishing rod 60 in a static position.

Figure 3:
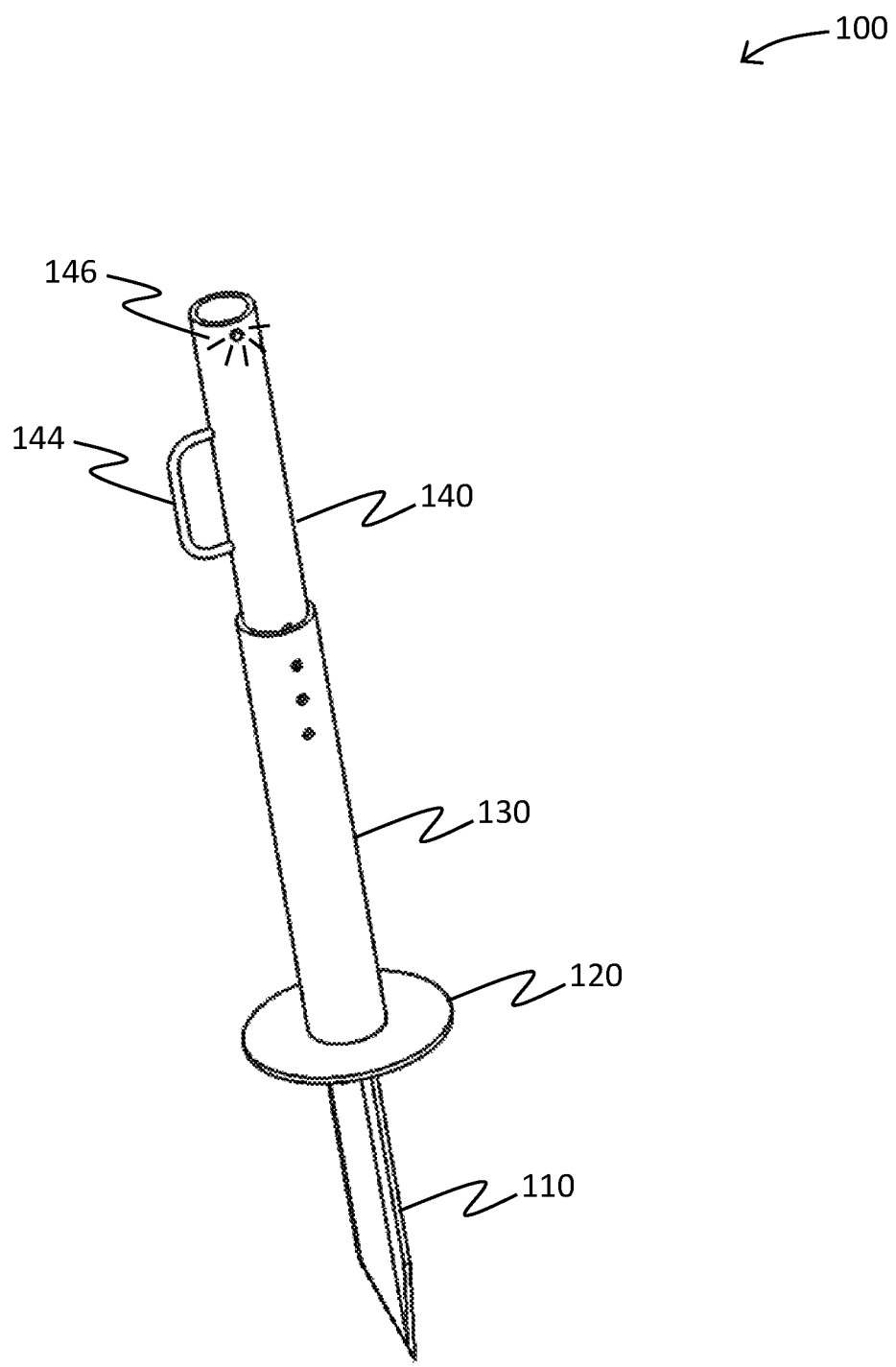
FIG. 3 is a perspective view of the fishing rod holder of FIG. 1, according to an embodiment of the present disclosure.

FIG. 3 is a view of the fishing rod holder 100 of FIG. 1, according to an embodiment of the present disclosure. As shown, the fishing rod holder 100 comprises a stake 110, a foot engaging flange 120, and elongate tubular member 130, and a rod retainer 140. The rod retainer 140 may include a handle 144 allowing for ease of portability. The handle 144 may be useful for engaging the substantially planar surface if the foot engaging flange 120 is detached or inoperable. Any size and dimension of handle 144 may be considered. In some embodiments, the handle 144 may be removed and replaced with a handle 144 of a different size and dimension. An illumination system 146 may be included with the fishing rod holder apparatus. The illumination system 146 may include a power-source, a light emitting diode, and a toggle switch. The illumination system 146 may be disposed on the rod retainer 140; however, the illumination system 146 may be located on any suitable part of the fishing rod holder 100. In one embodiment, the toggle switch may be located on the handle 144. In another embodiment, the light emitting diode is activated automatically.

Figure 4:
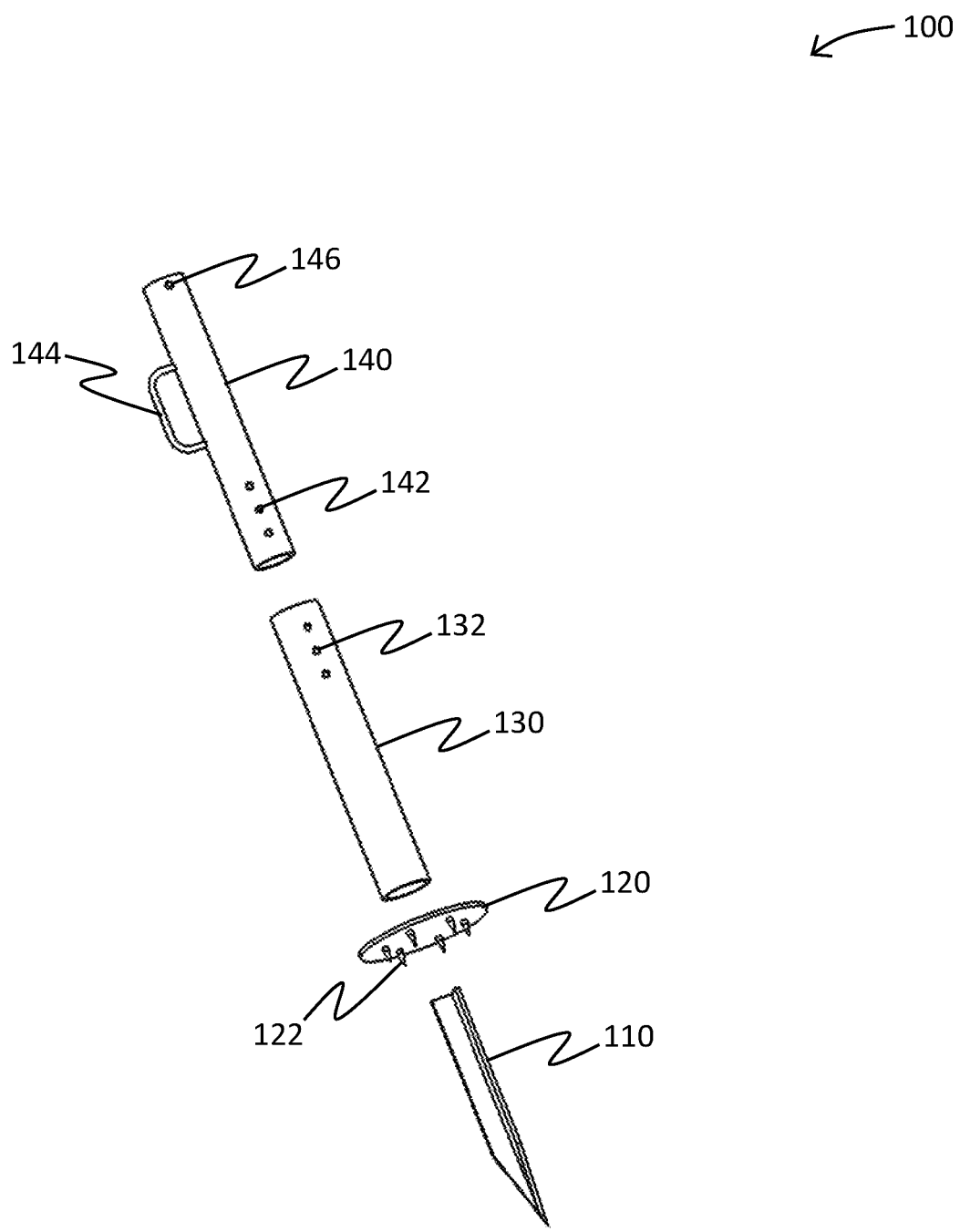
FIG. 4 is a perspective view of the fishing rod holder of FIG. 1, according to an embodiment of the present disclosure.

FIG. 4 is a disassembled view of the fishing rod holder 100 of FIG. 1, according to an embodiment of the present disclosure. Here shown is a disassembled view of the fishing rod holder apparatus. As illustrated, the fishing rod holder 100 comprises a stake 110, a foot engaging flange 120, an elongate tubular member 130, and a rod retainer 140. At least one peg aperture 132 is shown on the elongate tubular member 130. Correspondingly, the rod retainer 140 includes at least one peg 142 configured to mate with the apertures 132 on the elongate tubular member 130. A handle 144 and an illumination system 146 is shown connected to the rod retainer 140. In some embodiments, the foot engaging flange 120 may include outwardly pointing members 122 configured to engage the substantially planar surface. The fishing rod holder 100 may comprise steel, hard plastic, or a combination of both.

Figure 5:
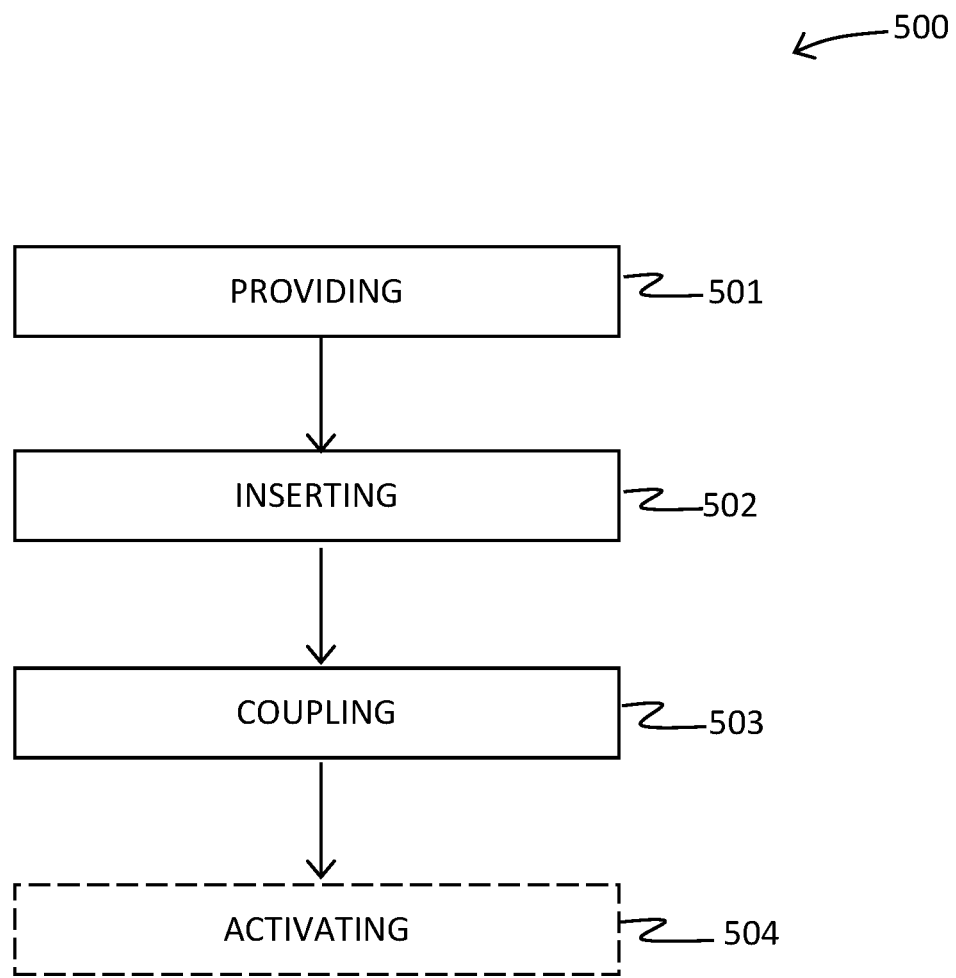
FIG. 5 is a flow diagram illustrating a method of using a fishing rod holder, according to an embodiment of the present disclosure.

FIG. 5 is a flow diagram illustrating a method for using a fishing rod holder 500, according to an embodiment of the present disclosure. In particular, the method for using a fishing rod holder 500 may include one or more components or features of the fishing rod holder 100 as described above. As illustrated, the method for using a fishing rod holder 500 may include the steps of: step one 501, providing a fishing rod holder; step two 502, inserting a stake of the fishing rod holder into a substantially planar surface; step three 503, coupling a fishing rod to the fishing rod holder; and step four 504, activating an illumination device of the fishing rod holder.

It should be noted that step 504 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using a fishing rod holder, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A fishing rod holder comprising:
    a stake having a pointed tip,
    a foot engaging flange attached to said stake at an end distal to said pointed tip,
    an elongate tubular member attached in series with said stake and said foot engaging flange, and
    a rod retainer, said rod retainer is configured to retain a fishing rod, said rod retainer sized to be telescopically coupled with said elongate tubular member, and,
        wherein said stake is configured to be inserted into a substantially planar surface for retaining said fishing rod in a substantially static position;
        wherein said stake is removably attachable to said foot engaging flange;
            wherein said foot engaging flange is detachable from said elongate tubular member;
            wherein said stake and said foot engaging flange are detachable;
            wherein said elongate tubular member includes at least one peg aperture;
            wherein said rod retainer includes at least one peg configured to mate with said at least one peg aperture;
            wherein said rod retainer includes a handle;
            wherein said rod retainer includes an illumination system;
            wherein said illumination system includes a power-source;
            wherein said illumination system includes a toggle switch;
            wherein said illumination system includes a light emitting diode;
            wherein said stake is a plurality of blades;
            wherein said foot engaging flange includes outwardly pointing members configured to engage said substantially planar surface;
            wherein said fishing rod holder comprises steel;
            wherein said fishing rod holder comprises hard plastic; and
            wherein said at least one peg is in communication with a spring.

2. The fishing rod holder of claim 1, further comprising a set of instructions.

* * * * *